US012231570B2

(12) United States Patent
Bhandarkar (10) Patent No.: US 12,231,570 B2
(45) Date of Patent: Feb. 18, 2025

(54) METHOD AND SYSTEM FOR CUSTOM AUTHENTICATORS

(71) Applicant: Konica Minolta Business Solutions U.S.A., Inc., Ramsey, NJ (US)

(72) Inventor: Pranay Bhandarkar, Union City, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 228 days.

(21) Appl. No.: 17/957,492

(22) Filed: Sep. 30, 2022

(65) Prior Publication Data
US 2024/0113886 A1 Apr. 4, 2024

(51) Int. Cl.
*H04L 9/08* (2006.01)
*H04L 9/32* (2006.01)
*H04W 4/80* (2018.01)

(52) U.S. Cl.
CPC .......... *H04L 9/3231* (2013.01); *H04L 9/0825* (2013.01); *H04L 9/3271* (2013.01); *H04W 4/80* (2018.02); *H04L 2209/80* (2013.01)

(58) Field of Classification Search
CPC ... H04L 9/3231; H04L 9/0825; H04L 9/3271; H04L 2209/80; H04W 4/80
USPC ......................................................... 713/168
See application file for complete search history.

(56) References Cited

U.S. PATENT DOCUMENTS

| | | | | |
|---|---|---|---|---|
| 2018/0351739 A1* | 12/2018 | Ota | .................. | G06V 40/70 |
| 2019/0141214 A1* | 5/2019 | Matsumoto | ............ | H04N 1/442 |
| 2021/0194703 A1* | 6/2021 | Queralt | ............... | H04L 63/0815 |
| 2022/0232005 A1* | 7/2022 | Kinoshita | ............... | H04L 67/01 |
| 2022/0377063 A1* | 11/2022 | Gomi | .................... | H04L 9/3271 |
| 2022/0400014 A1* | 12/2022 | Mori | ..................... | G06F 3/1289 |
| 2023/0163971 A1* | 5/2023 | Tokunaga | ............. | H04L 9/3271 |
| | | | | 455/411 |

OTHER PUBLICATIONS

Haonan Feng; FIDO Gets Verified: A Formal Analysis of the Universal Authentication Framework Protocol; IEEE; Jul. 9, 2024; pp. 4291-4310.*

* cited by examiner

*Primary Examiner* — Monjur Rahim
(74) *Attorney, Agent, or Firm* — Buchanan Ingersoll & Rooney PC (57) ABSTRACT

A method, a non-transitory computer readable medium, and a multifunction peripheral that includes a method for accessing the multifunction peripheral. The method includes receiving, by a processor, a Fast Identity Online-based (FIDO-based) authentication from a client device via a wireless communication, the FIDO-based authentication configured to provide a user of the client device access to the multifunction peripheral; determining, by the processor, a validity of the FIDO-based authentication from the client device of the user; and granting, by the processor, the user access to the multifunction peripheral when the validity of the FIDO-based authentication from the client device of the user has been validated.

20 Claims, 5 Drawing Sheets

METHOD AND SYSTEM FOR CUSTOM AUTHENTICATORS

FIELD OF THE DISCLOSURE

The present disclosure generally relates to a method and system for custom authenticators, for example, a device having a near-field communication or Bluetooth capability to access a multifunction peripheral or multifunction printer (MFP).

BACKGROUND

Multifunction peripherals or multifunction printers (MFP) often require users to login so that the managed print services can be implemented. The managed print services can include, for example, user authentication that control identities of users, which can help ensure that users have been authenticated at the MFP before a print job is released and/or printed. In addition, managed print services allow administrators to track and monitor usage in real time through regular, scheduled and on-demand reporting, management and charge back of costs by assigning users to cost centers, entering of billing or project codes before printing a document. Managed print services can also create print rules or policies, which can help ensure, for example, cost management by allowing different user roles to access different devices and features. For example, duplex printing and/or color printing may be allowed by certain individuals and/or groups and not permitted to other individuals and/or groups.

As more and more authentication methods are added, for example, through the use biometric identifiers and the like for accessing multifunction peripherals or multifunction printers (MFP), each of the authentication methods need to be supported by the MFP, which can require software updates and the like. Accordingly, it would desirable to encourage users to use their own personal devices, for example, a smart phone or a smart watch as a source of authentication (or authenticator) in which the authentication methods are supported, for example, by the user's personal device rather than having to add each of the of authentication methods as authenticators a workflow for the MFP.

SUMMARY

In consideration of the above issues, it would be desirable to have a method and system that provides for custom authenticators that can include, for example, devices having biometric authenticators with wireless capabilities including near-field communication (NFC) or Bluetooth for accessing a multifunction peripheral or multifunction printer (MFP).

In accordance with one aspect, a method is disclosed for accessing a multifunction peripheral, the method comprising: receiving, by a processor, a Fast Identity Online-based (FIDO-based) authentication from a client device via a wireless communication, the FIDO-based authentication configured to provide a user of the client device access to the multifunction peripheral; determining, by the processor, a validity of the FIDO-based authentication from the client device of the user; and granting, by the processor, the user access to the multifunction peripheral when the validity of the FIDO-based authentication from the client device of the user has been validated.

In accordance with another aspect, a computer program product for accessing a multifunction peripheral is disclosed, the computer program product comprising: a non-transitory computer-readable storage medium having program instructions embodied therewith, the program instructions executable by a computer to cause the computer to perform a process, comprising: receiving a Fast Identity Online-based (FIDO-based) authentication from a client device via a wireless communication, the FIDO-based authentication configured to provide a user of the client device access to the multifunction peripheral; determining a validity of the FIDO-based authentication from the client device of the user; and granting the user access to the multifunction peripheral when the validity of the FIDO-based authentication from the client device of the user has been validated.

In accordance with a further aspect, a multifunction peripheral comprising: a memory; a graphical user interface; and a processor configured to: receive a Fast Identity Online-based (FIDO-based) authentication from a client device via a wireless communication, the FIDO-based authentication configured to provide a user of the client device access to the multifunction peripheral; determine a validity of the FIDO-based authentication from the client device of the user; and grant the user access to the multifunction peripheral when the validity of the FIDO-based authentication from the client device of the user has been validated.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 1:
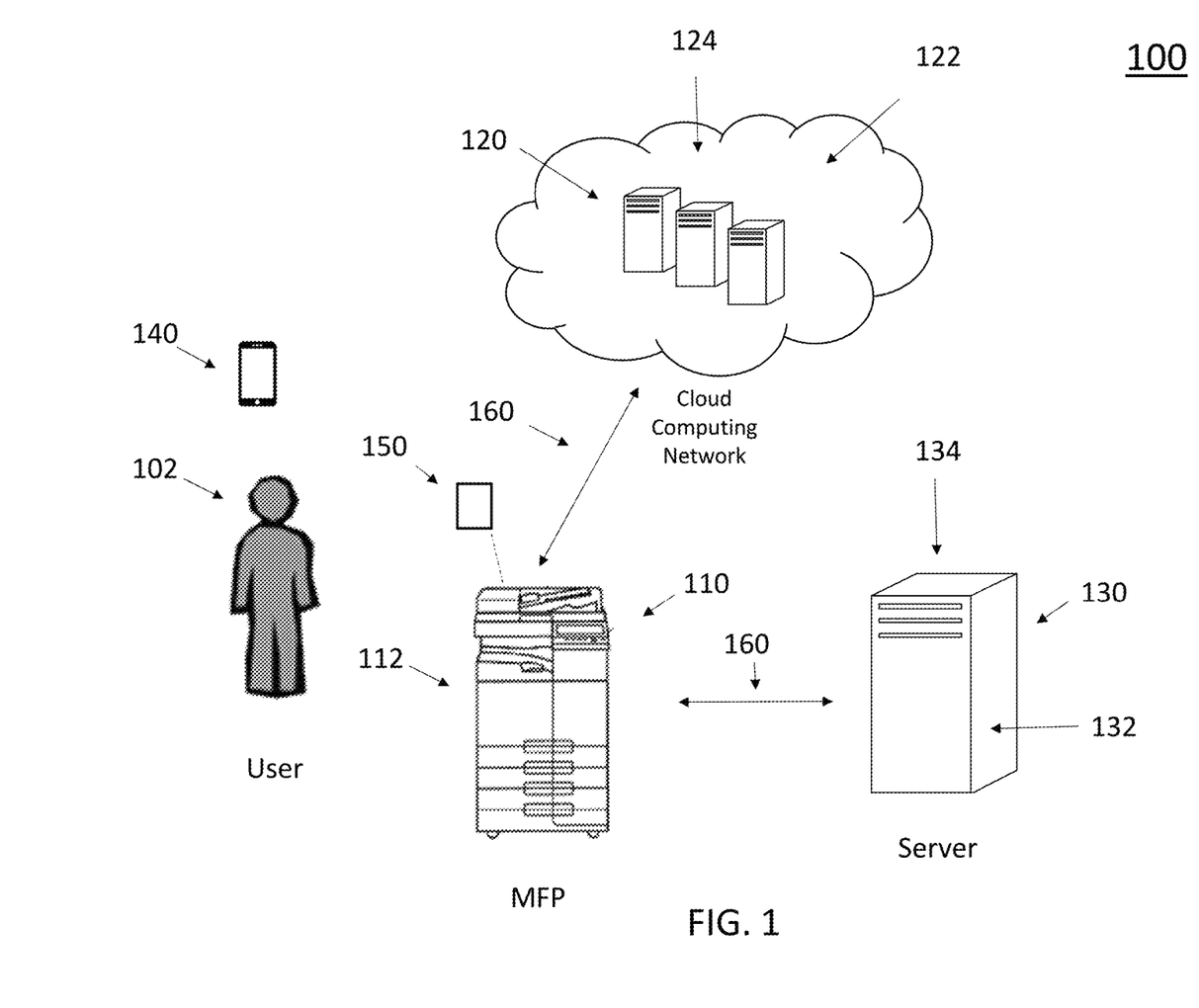
FIG. 1 is an illustration of a system for authenticating users on a computer system in accordance with an exemplary embodiment.

FIG. 1 is an illustration of a system 100 for authenticating users 102 on a computer system 110 in accordance with an exemplary embodiment. As shown in FIG. 1, the system 100 can include a computer system 110, for example, a multifunction peripheral or multifunction printer (MFP) and one or more computer system 120, 130, which can be configured to host, for example, one or more of managed print services and/or authentication authority that supports, for example, an authentication protocol including Fast Identity Online (FIDO). The FIDO Alliance develops open and scalable technical specifications that allow people to access websites and applications, for example, through a common protocol using, for example, passkeys, for secure authentication. A passkey is a FIDO login credential, tied to an origin (website or application) and a physical device (e.g., client device 140). Passkeys allow users to authenticate without having to enter a username, password, or provide any additional authentication factor, which can enable a user 102 to leverage, for example, smart phones and/or smart watches with passwordless authentication.

The system 100 can also include a user 102, and a client device 140 that can authenticate that the user 102, for example, for access to the computer system 110 as disclosed herein. In accordance with an embodiment, the client device 140 can be, for example, a mobile client, for example, a smart phone, a smart tablet, smart watch, or a biometric band that can be used an authentication device, for example, for authentication of the user 102 on the computer system 110. The authentication of the user 102 on the computer system 110 can be, for example, a FIDO authentication workflow for access to the computer system 110, for example, a multifunction peripheral (MFP) or printer 112, and managed print services 124, 134 that can be hosted on the computer systems 120, 130. The computer system 110 is configured to receive, for example, communications from a client device 140 via a near-field communication (NFC) or Bluetooth protocol.

The one or more computer systems 110, 120, 130, and the client device 140 can include a processor or central processing unit (CPU), and one or more memories for storing software programs and data. The processor or CPU carries out the instructions of a computer program, which operates and/or controls at least a portion of the functionality of the devices the one or more computer systems 110, 120, 130, and the client device 140. The one or more computer systems 110, 120, 130, and the client device 140 can also include an operating system (OS), which manages the computer hardware and provides common services for efficient execution of various software programs. For example, the software programs can include application software, for example, for managing an authentication module and/or biometric identifier, and/or printer driver software, for example, for one or more of the computer systems 110, 120, 130, for example, the computer system 110, for example, the multifunction peripheral (MFP) or printer 112.

In accordance with an embodiment, the computer system 110 can be a multifunction peripheral (MFP) or printer 112, which can include at least a copy function, an image reading function, a facsimile (fax) function, and a printer function, and forms an image on a sheet based on a print job multifunction peripheral (print instruction) received, for example, from the computer system 110. The MFP or printer 112 preferably includes a display panel 150.

The computer system 110 can alternatively, for example, be a medical device or a medical apparatus, which can be used, for example, for diagnostic and/or therapeutic purposes. Examples of medical devices or medical apparatuses can include medical imaging devices, which can obtain, for example, radiological, angiographic, sonographic, and/or tomographic images. Alternatively, the one or more computer systems 110, 120, 130, for example, the computer system 120, 130 can be, for example, a back-end database, or enterprise database system, which can be accessed by the one or more users indirectly through an external application, for example, through the computer system 110.

In accordance with an embodiment, when the computer system 110 is a multifunction peripheral (MFP) or printer, the one or more computer systems 120, 130 can be configured to host, for example, managed print services 124, 134. The managed print services 124, 134 can include, for example, one or more of user authentication, monitoring and reporting, user and cost management, cost accounting and budget management, printer queue management, and workflow management. For example, user authentication can include control over identities of user, which can help ensure that users have been authenticated at a device before a print job is released and/or printed. The monitoring and report features can allow administrators to track and monitor usage in real time through regular, scheduled and on-demand reporting. The user and cost management feature can help manage and charge back costs by assigning users to cost centers, or enabling them to select the relevant cost center, billing or project code before printing a document. In addition, the user and cost management feature can be used to create print rules or policies, which can help ensure tighter cost management by allowing different user roles to access different devices and features. For example, the user and cost management feature can control, for example, duplex printing and/or color printing to individuals and/or groups. In addition, cost accounting and budget management provides for cost control and flexibility, which can be used as a print management solution that allows administrators to assign print budgets to users, with the option to top up their accounts. For example, in an environment such as a university, for example, this allows administrators to give students a free print quota that they can add to as required. In addition, a print queue management can be used for manage of individual production in addition to office print queues in an office, for example.

The one or more computer systems 110, 120, 130, and the client device 140 can be connected via a communication network 160. The communication network 160 may include, for example, a conventional type of network, wired or wireless, and may have any number of configurations, such as a star configuration, token ring configuration, or other known configurations. The communication network 160 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

Data may be transmitted in encrypted or unencrypted form between the one or more computer systems 110, 120, 130, and the client device 140 using a variety of different communication protocols including, for example, various Internet layer, transport layer, or application layer protocols. For example, data may be transmitted between the one or more computer systems 110, 120, 130, and the client device 140 via the network 160 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

As shown in FIG. 1, the user 102 can present an authenticator to the computer system 110. The authentication of the user 102 on the computer system 110 can be via, for example, the client device 140 via a near-field communication (NFC) or Bluetooth. For example, the user 102 can be authenticate on the client device 140, which can be, for example, a security identification and authentication device (or authenticator), which uses automated methods of verifying or recognizing the identity of a living person based on a physiological or behavioral characteristic. Thus, the user need not to manually input passwords to the computer system 110, for example, the multifunction peripheral (MFP) or printer 112. The method of recognizing the user 102 can include, for example, fingerprints, electrocardiogram (ECG or EKG) information, facial images, iris, and voice recognition. For example, in accordance with an exemplary embodiment, the client device 140 can be a wearable device, for example, a Nymi™ band, which detection of the user 102 is based on the electrocardiogram (ECG) and its unique properties, e.g., electrical activity of the heartbeat of the user (e.g., wearer) 102.

For example, authentication via the client device 140 can include the presentation, for example, of mobile device, smart phone, or smart watch of the user 102 to a vicinity of the authenticator (e.g., client device 140) via a near-field communication (NFC) network (e.g., Bluetooth®) and wherein the user 102 has previously been authenticated on the mobile device or smart phone by one or more of a user identifier (ID) and password and/or a biometric identifier, for example, facial recognition, fingerprint, of the like. In accordance with an embodiment, the authentication of the user 102 can be a FIDO authentication workflow as disclosed herein.

In accordance with an exemplary embodiment, the authentication of the user 102 on the client device 140 can be a biometric identifier, which is a distinctive, measurable characteristics used to label and describe or identify an individual, including a metric related to human characteristics. For example, the biometric identifier can include physiological characteristics of an individual including but not limited fingerprints, palm veins, face recognition, DNA (or deoxyribonucleic acid), palm print, hand geometry, iris recognition, retina, and/or odor/scent.

In accordance with an embodiment, the authentication of the user 102 can be via the client device 140 using a FIDO protocol (or FIDO authentication workflow). The FIDO protocols use standard public key cryptography techniques to provide authentication. In accordance with an embodiment, the user 102 during registration with the computer system 110, the client device 140 of the user 102 creates a new key pair. The client device 140 of the user 102 retains the private key and registers the public key with, for example, the computer system 110. Authentication can be done by the client device 140 proving possession of the private key to the computer system 110 by signing a challenge. For example, the private key(s) of the client device 140 can be used only after the private key(s) are unlocked locally on the client device 140 by the user 102. For example, in accordance with an embodiment, the local unlock of the private keys of the client device 140 can be accomplished by an action such as biometric identifier of the user 102.

Figure 2A:
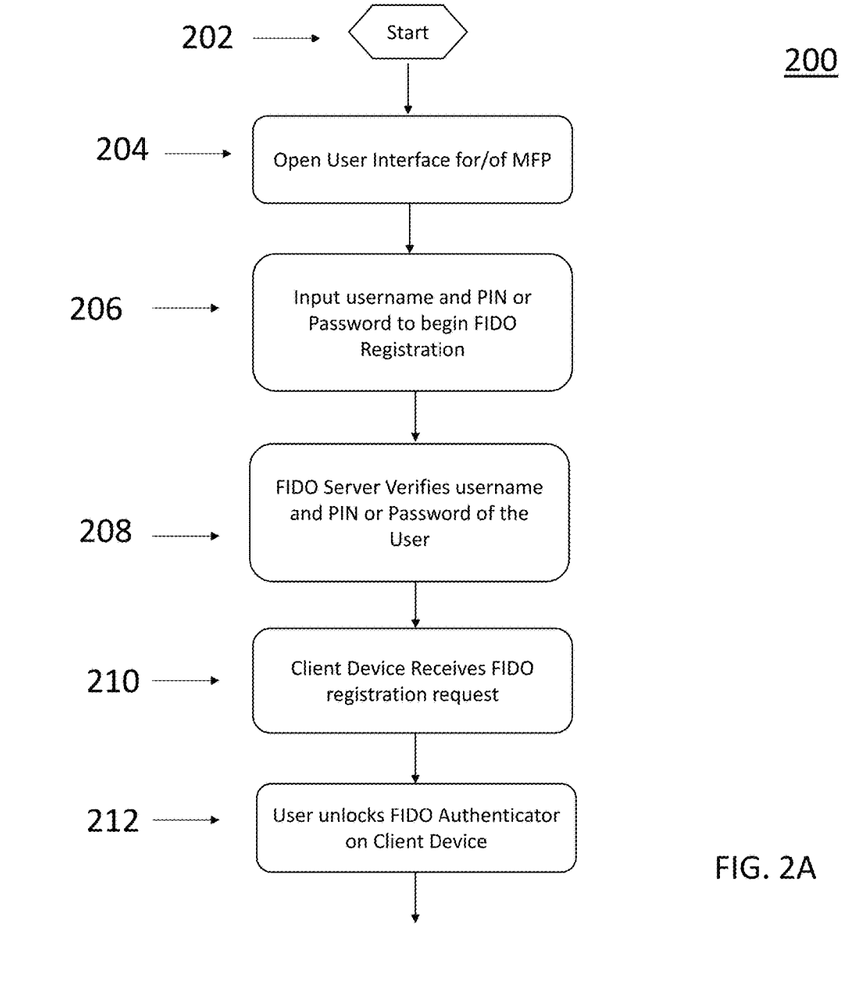
FIGS. 2A and 2B is a flowchart illustrating an example of a FIDO registration process for a user with a multifunction peripheral (MFP) in accordance with an exemplary embodiment.
Figure 2B:
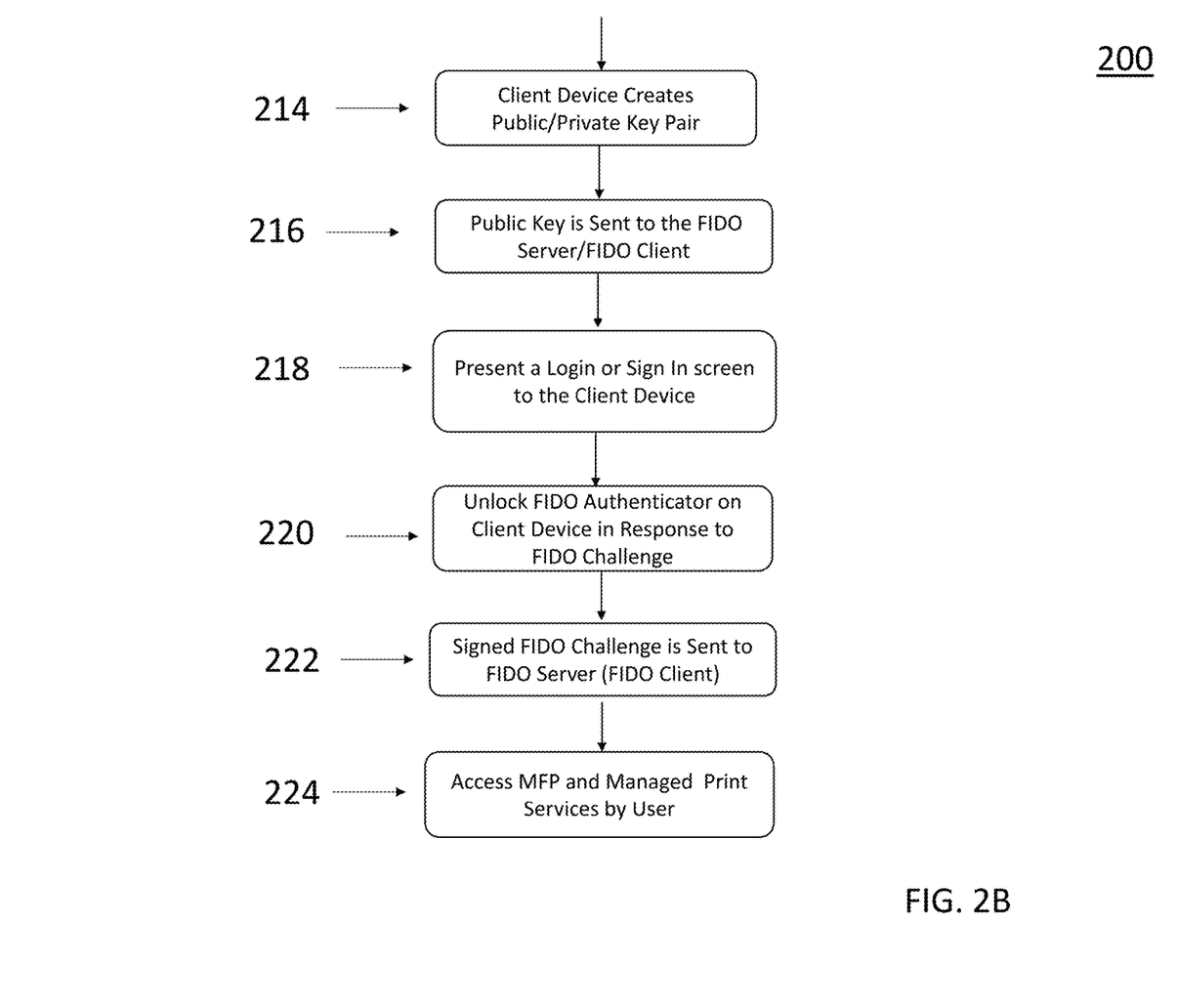

FIGS. 2A and 2B is a flowchart illustrating an example of FIDO registration process 200 for a user 102 with an MFP 112 in accordance with an exemplary embodiment. As shown in FIGS. 2A and 2B, the process starts in step 202 where the user 102 opens, for example, a website (e.g., MFP application) associated with the MFP 112 on a user interface (or display screen) of the client device 140 or the display panel 150 of the MFP 112. The website (or MFP application) will present the user with a FIDO registration application for the MFP 112 and/or managed print services 124, 134 available on the MFP 112. The FIDO registration application can be configured to register the client device 140 of the user 102 to access one or more of the MFP 112 and/or the managed print services 124, 134, of the MFP 112. In accordance with an embodiment, the FIDO registration application can be, for example, on the display panel 150 of the MFP 112, for registration of smart watches and/or wearable devices. In step 204, the FIDO registration application on the client device 140 (or the display panel 150 of the MFP 112) can request that the user 102, for example, input a username and personal identification number (PIN) or password (e.g., login) to begin the FIDO registration process. The username and the PIN or password can be provided to the user 102, for example, by the MFP 112 or managed print services 124, 134 prior to the FIDO registration process. In step 208, the FIDO server verifies the login from the user 102 and that the user 102 has been authorized to access the MFP 112 and one or more managed print services 124, 134 associated with the MFP 112. The entry of the login from the user 102 starts the FIDO registration process for the user 102. The FIDO registration process, for example, can be with the FIDO server hosted on one or more of the computer systems 112, 120, 130. In step 210, the FIDO server returns a FIDO registration request to the registration application on the client device 140 of the user 102, and which prompts the user 102 to choose a FIDO authenticator that that matches an acceptance policy of the MFP 112, or the managed print services 124, 134. For example, in accordance with an embodiment, the acceptance policy of the MFP 112 can require that the FIDO authenticator, for example, can require that the user 102 enter a biometric identifier, for example, a fingerprint or facial recognition that the user 102. In accordance with an embodiment, the biometric identifier can be, for example, the same biometric identifier that the user 102 uses to unlock the client device 140, for example, a smart phone. If the FIDO server is hosted on one of the computer systems 120, 130, rather than the MFP 112, the MFP 112 can act as FIDO client. In step 212, the user 102 unlocks the FIDO authenticator on the client device 102 using, for example, a fingerprint reader or facial recognition on the client device 140, a securely entered PIN, or other authentication method supported by the client device 140. In accordance with an embodiment, the MFP 112 and/or the managed print services 124, 134 can have an acceptance policy, which requires certain authenticators, for example, at least one biometric identifier, two-factor authentication (2FA), or multifactor authentication as an acceptance policy for the registered client device 140. In step 214, the client device 140 of the user creates a public/private key pair (e.g., passkey) unique for the client device 140 and the services provided the MFP 112 and the managed print services 124, 134 supported by the MFP 112. In step 216, the public key is sent to the FIDO server 112, 120, 130 associated with the MFP 112 and the managed print services 124, 134. In accordance with an embodiment, if the FIDO server is hosted on computer systems 120, 130, the MFP 112 can include a FIDO client. The private key and any information about the authentication method (for example, biometric measurements) do not leave the client device 140, such that the biometrics of the user 102, for example, are not shared with the MFP 112 or the computer systems 120, 130.

In accordance with an embodiment, in step 218, the user 102 can access the MFP 112 by opening, for example, the MFP application, which will present the user 102 with a login or sign in screen, which requires the user 102 to enter a password or biometric to unlock the FIDO authenticator in the client device 140. In step 220, the user 102 unlocks the FIDO authenticator on the client device 140 using the same authentication method as at the time of the registration of the client device 140 during a challenge from the MFP 112 (i.e., MFP's challenge). The client device 140 uses the user's account identifier provided by the MFP 112 to select the correct authentication method or key and signs the MFP's challenge. In step 222, the client device 140 sends the signed challenge back to the MFP 112, which verifies the signed challenge with the stored public key in the FIDO server and logs in (or signs in) the user 102 to the MFP 112.

In accordance with an embodiment, the MFP 112 can be configured to send the MFP's challenge to the client device 140 upon the client device 140 being brought within a certain distance, for example, of the MFP 112. For example, the communications between the client device 140 and the MFP 112 can be via a near field communication or Bluetooth protocol, and the detection of the client device 140 or a tap of the MFP 112 on a reader of the MFP 112. Accordingly, the user 102 can be authorized to access the MFP 112 without an opening of the MFP application.

Once, the user 102 has been authenticated on the MFP 112, in step 224, the user 102 can use the managed print services 124, 134 in which the user 102 has authorized by, for example, an administrator.

In addition, the FIDO protocol as disclosed can be a FIDO2 protocol that consist of a W3C Web Authentication (WebAuth) standard and the FIDO Client to Authenticator Protocol 2 (CTAP2).

In accordance with an embodiment, the method and system for custom authenticators using the FIDO protocol as disclosed herein, can also be integrated with one or more federation protocols, for example, Security Assertion Markup Language (SAML), OpenID Connect (OIDC), and Open Authorization (OAuth). For example, a SAML service provider (SP) can requests from the SAML identity provider (IDP) that user authentication be FIDO-based. In accordance with an embodiment, a SAML IDP returns a SAML Assertion to the service provider (SP) indicating that user authentication was performed using FIDO. A OIDC (relying party) RP requests from the OIDC Provider that authentication be FIDO-based. An OIDC Provider returns a token to the relying party (RP) indicating that user authentication was performed using FIDO, and how. In addition, FIDO could be leveraged in OAuth2 environments for user authentication prior to user consent and authorization to access a protected resource, for example, the managed print services.

Figure 3:
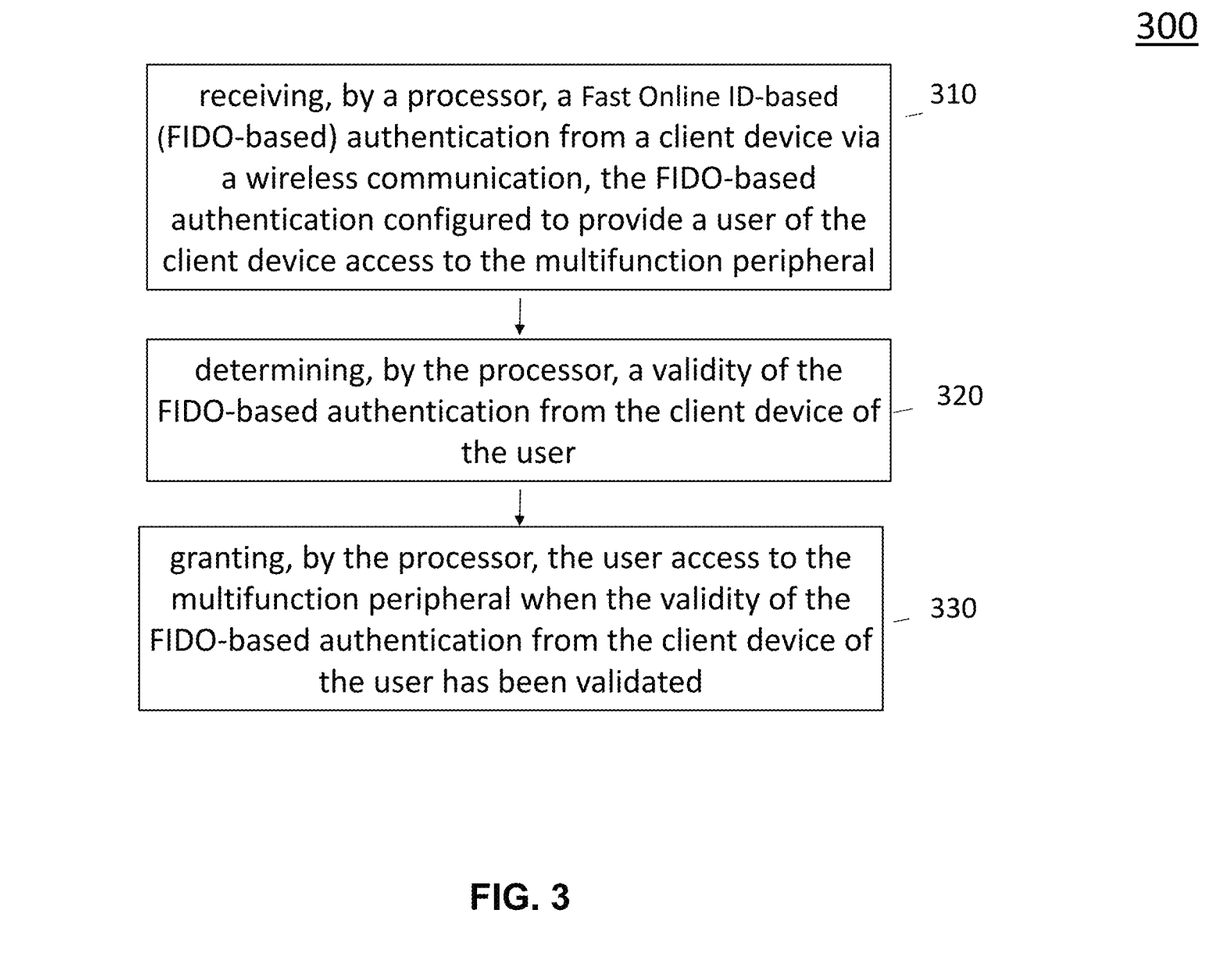
FIG. 3 is a flowchart for custom authenticators for multifunction peripherals (MFP) in accordance with an embodiment in accordance with an embodiment.

FIG. 3 is a flowchart 300 for custom authenticators for multifunction peripherals (MFP) in accordance with an embodiment in accordance with an embodiment. As shown in FIG. 3, is step 310, a processor receives a Fast Online ID-based (FIDO-based) authentication from a client device 140 via a wireless communication, the FIDO-based authentication configured to provide a user 102 of the client device 140 access to the multifunction peripheral 112. In step 320, the processor determines a validity of the FIDO-based authentication from the client device 140 of the user 102. In step 330, the processor grants the user 102 access to the multifunction peripheral 112 when the validity of the FIDO-based authentication from the client device 140 of the user 102 has been validated.

In accordance with an embodiment, the FIDO-based authentication is based on a biometric identifier received by the client device 140 for the user 102. For example, the biometric identifier of the FIDO-based authentication can be from biometric authenticator device. The biometric authenticator device can include one or more of a sensor, a scanning device, or an electronic reader, and wherein the biometric identifier of the user 102 being at least one physiological characteristic of the user 102, and wherein the at least one physiological characteristic is selected from one or more of fingerprints, palm veins, face recognition, DNA (deoxyribonucleic acid), palm print, hand geometry, iris recognition, retina, and/or odor/scent.

In accordance with an embodiment, the validity of the FIDO-based authentication from client device 140 of the user 102 can include sending, by the processor, an online service challenge to the client device 140 of the user 102 to login with a previously registered device that matches an acceptance policy of the multifunction peripheral 112, receiving, by the processor, a response to the online service challenger, the response including a private key from the client device 140; and verifying, by the processor, that the private key received from the client device 140 matches a stored public key in a FIDO server. In accordance with an embodiment, the processor can be a FIDO client on the multifunction peripheral 112, and the method further includes accessing the FIDO server that is external to the multifunction peripheral 112 to verify that the private key received from the client device 140 matches the stored public key in the FIDO server. In addition, the online service challenge can be received by the client device 140 via a pop-up, the pop-up being a graphical user 102 interface (GUI) that appears on a display of the client device 140.

In accordance with an embodiment, the client device 140 is a mobile device, a smart phone, or a wearable device. In addition, the wireless communication can be a near-field communication (NFC) or a Bluetooth technology standard.

In accordance with an embodiment, the method further includes granting, by the processor, access to the user 102 to one or more managed print services provider by a service provider to the multifunction peripheral 112. The processor and the service provider can be hosted, for example, on an internal web server.

In accordance with an embodiment, the client device 140 is a smart phone or a smart watch and the multifunction peripheral 112 includes a reader, and wherein the reader of the multifunction peripheral 112 receives the FIDO-based authentication from a tap of the smart phone or the smart watch on the reader.

In accordance with an exemplary embodiment, the receiving of the FIDO-based authentication from the client device 140 for the user 102 can be via the communication protocol on the processor, which does not require an opening of a website on the client device 140.

In accordance with an embodiment, the method further includes receiving, by the processor, the FIDO-based authentication from a reader that is external to the multifunction peripheral 112. The FIDO-based authentication can be from the client device 140 using a same authenticator as the user 102 uses to access the client device 140. For example, the same authenticator can be at least one of a biometric identifier or a multifactor authentication.

In accordance with an embodiment, the processor is part of the multifunction peripheral 112, and the granted access to the multifunction peripheral 112 for the user 102 include access to managed print services hosted by a service provider external to the multifunction peripheral 112.

Figure 4:
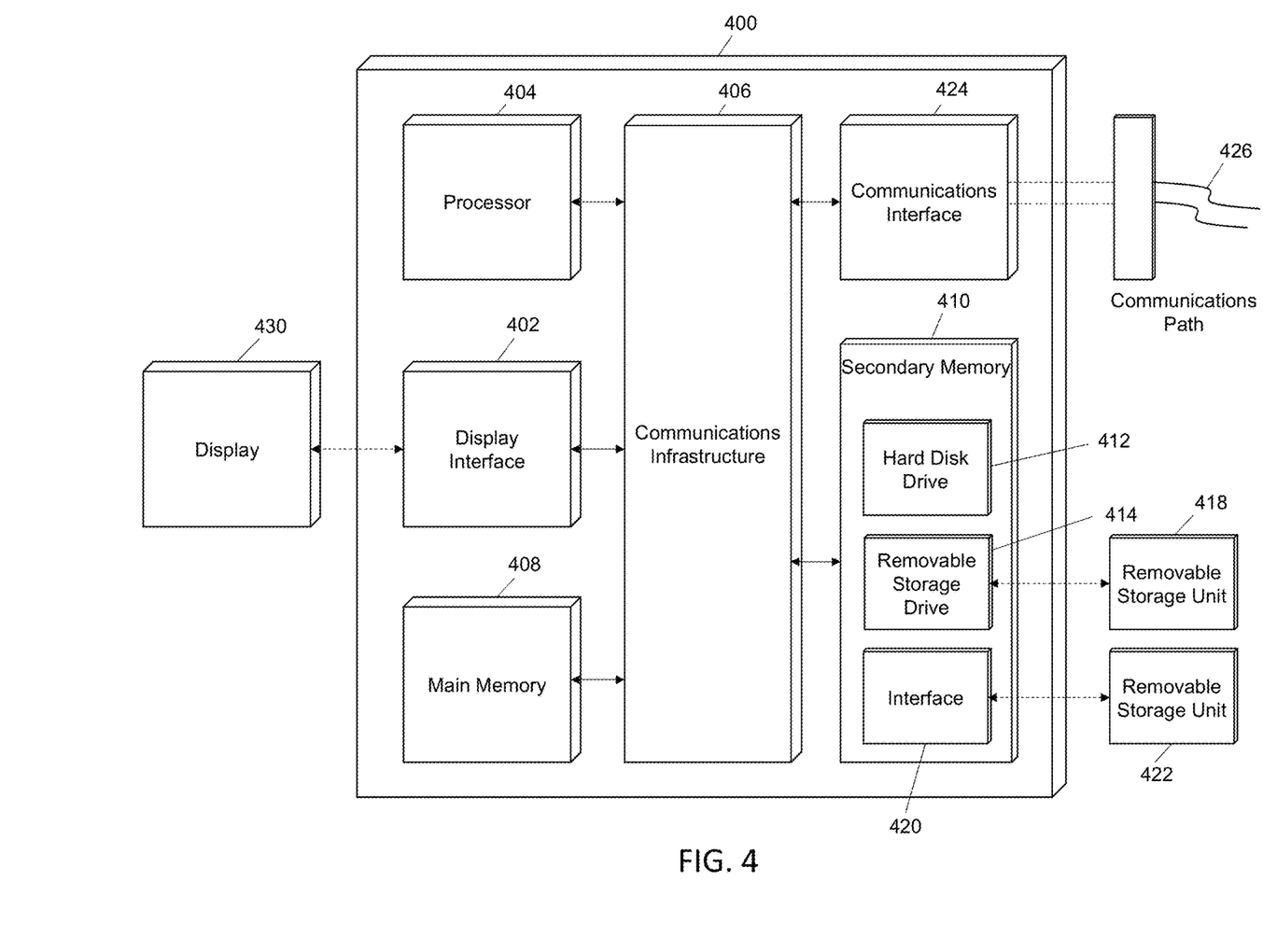
FIG. 4 is an illustration of an exemplary hardware architecture for an embodiment of a computer system.

FIG. 4 illustrates a representative computer system 400 in which embodiments of the present disclosure, or portions thereof, may be implemented as computer-readable code executed on hardware. For example, the one or more computer systems 110, 112, 120, 130, or client devices 140 associated with the method and system for custom authenticators as disclosed herein may be implemented in whole or in part by a computer system 400 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this representative computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 404 may be processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIGS. 1-3, as discussed herein. Accordingly, such computer programs may represent controllers of the computer system 400. Where the present disclosure is implemented using software executed on hardware, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software executed on hardware, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for accessing a multifunction peripheral, the method comprising:
   receiving, by a processor, a Fast Identity Online-based (FIDO-based) authentication from a client device via a wireless communication, the FIDO-based authentication configured to provide a user of the client device access to the multifunction peripheral;
   determining, by the processor, a validity of the FIDO-based authentication from the client device of the user;
   granting, by the processor, the user access to the multifunction peripheral when the validity of the FIDO-based authentication from the client device of the user has been validated, wherein the validity of the FIDO-based authentication from client device of the user comprises:
      sending, by the processor, an online service challenge to the client device of the user to provide the FIDO-based authentication from the client device of the user that matches an acceptance policy of the multifunction peripheral, the FIDO-based authentication being an authentication method supported by the client device;
      receiving, by the processor, a response to the online service challenger, the response including a public key from the client device; and
      verifying, by the processor, that the public key received from the client device matches a stored public key in a FIDO server; and
   executing one or more of a copy function, an image reading function, a facsimile (fax) function, and a printer function on the multifunction peripheral after the user has been granted access to the multifunction peripheral.

2. The method according to claim 1, wherein the FIDO-based authentication is based on a biometric identifier received by the client device for the user.

3. The method according to claim 2, wherein the biometric identifier of the FIDO-based authentication is from biometric authenticator device, the biometric authenticator device including one or more of a sensor, a scanning device, or an electronic reader, and wherein the biometric identifier of the user being at least one physiological characteristic of the user, and wherein the at least one physiological characteristic is selected from one or more of fingerprints, palm veins, face recognition, DNA (deoxyribonucleic acid), palm print, hand geometry, iris recognition, retina, and/or odor/scent.

4. The method according to claim 1, wherein the processor is a FIDO client device on the multifunction peripheral, further comprising:

accessing, by the processor, the FIDO server that is external to the multifunction peripheral to verify that the public key received from the client device matches the stored public key in the FIDO server.

5. The method according to claim 1, wherein the online service challenge is received by the client device via a pop-up, the pop-up being a graphical user interface (GUI) that appears on a display of the client device.

6. The method according to claim 1, wherein the client device is a mobile device, a smart phone, or a wearable device.

7. The method according to claim 1, wherein the wireless communication is a near-field communication (NFC) or a Bluetooth technology standard.

8. The method according to claim 1, further comprising: granting, by the processor, access to the user to one or more managed print services provider by a service provider to the multifunction peripheral.

9. The method according to claim 8, wherein the processor and the service provider are hosted on an internal web server.

10. The method according to claim 1, wherein the client device is a smart phone or a smart watch, and the multifunction peripheral includes a reader, further comprising: receiving, by the reader of the multifunction peripheral, the FIDO-based authentication from a tap of the smart phone or the smart watch on the reader.

11. The method according to claim 1, wherein the receiving of the FIDO-based authentication from the client device for the user via the communication protocol on the processor does not require an opening of a website on the client device.

12. The method according to claim 1, further comprising: receiving, by the processor, the FIDO-based authentication from a reader that is external to the multifunction peripheral.

13. The method according to claim 1, wherein the FIDO-based authentication from the client device uses a same authenticator as the user uses to access the client device, the same authenticator being at least one of a biometric identifier or a multifactor authentication.

14. The method according to claim 1, wherein the processor is part of the multifunction peripheral, and the granted access to the multifunction peripheral for the user include access to managed print services hosted by a service provider external to the multifunction peripheral.

15. The method according to claim 1, wherein the validity of the FIDO-based authentication from client device of the user is without regard to the client device.

16. The method according to claim 1, wherein the validity of the FIDO-based authentication from client device of the user further comprises:
selecting, by the client device, a correct authentication method and signing a challenge from the multifunction peripheral using an account identifier of the user received from the multifunction peripheral; and
sending, by the client device, the signed challenge back to the multifunction peripheral, which verifies the signed challenge with the stored public key from the FIDO server.

17. The method according to claim 1, wherein the public key is part of a passkey, the passkey including a private-public key pair, and wherein a private key of the private-public key pair and information about the authentication method do not leave the client device.

18. A computer program product for accessing a multifunction peripheral, the computer program product comprising:
a non-transitory computer-readable storage medium having program instructions embodied therewith, the program instructions executable by a computer to cause the computer to perform a process, comprising:
receiving a Fast Identity Online-based (FIDO-based) authentication from a client device via a wireless communication, the FIDO-based authentication configured to provide a user of the client device access to the multifunction peripheral;
determining a validity of the FIDO-based authentication from the client device of the user; and
granting the user access to the multifunction peripheral when the validity of the FIDO-based authentication from the client device of the user has been validated, wherein the validity of the FIDO-based authentication from client device of the user comprises:
sending, by the processor, an online service challenge to the client device of the user to provide the FIDO-based authentication from the client device of the user that matches an acceptance policy of the multifunction peripheral, the FIDO-based authentication being an authentication method supported by the client device;
receiving, by the processor, a response to the online service challenger, the response including a public key from the client device; and
verifying, by the processor, that the public key received from the client device matches a stored public key in a FIDO server; and
executing one or more of a copy function, an image reading function, a facsimile (fax) function, and a printer function on the multifunction peripheral after the user has been granted access to the multifunction peripheral.

19. The computer program product according to claim 18, wherein the FIDO-based authentication is based on a biometric identifier received by the client device for the user, and the biometric identifier of the FIDO-based authentication is from biometric authenticator device, the biometric authenticator device including one or more of a sensor, a scanning device, or an electronic reader, and wherein the biometric identifier of the user being at least one physiological characteristic of the user, and wherein the at least one physiological characteristic is selected from one or more of fingerprints, palm veins, face recognition, DNA (deoxyribonucleic acid), palm print, hand geometry, iris recognition, retina, and/or odor/scent.

20. A multifunction peripheral comprising:
a memory;
a graphical user interface; and
a processor configured to:
receive a Fast Identity Online-based (FIDO-based) authentication from a client device via a wireless communication, the FIDO-based authentication configured to provide a user of the client device access to the multifunction peripheral;
determine a validity of the FIDO-based authentication from the client device of the user; and
grant the user access to the multifunction peripheral when the validity of the FIDO-based authentication from the client device of the user has been validated, wherein the validity of the FIDO-based authentication from client device of the user comprises:
sending, by the processor, an online service challenge to the client device of the user to provide the FIDO-based authentication from the client device of the user that matches an acceptance policy of the multifunction peripheral, the FIDO-based authentication being an authentication method supported by the client device;

receiving, by the processor, a response to the online service challenger, the response including a public key from the client device; and verifying, by the processor, that the public key received from the client device matches a stored public key in a FIDO server; and execute one or more of a copy function, an image reading function, a facsimile (fax) function, and a printer function on the multifunction peripheral after the user has been granted access to the multifunction peripheral.

\* \* \* \* \*